US006175167B1

(12) United States Patent
Lorenz et al.

(10) Patent No.: US 6,175,167 B1
(45) Date of Patent: Jan. 16, 2001

(54) HIGH-VOLTAGE OUTDOOR SWITCH

(75) Inventors: Dieter Lorenz; Manfred Meinherz, both of Berlin (DE)

(73) Assignee: Siemens Aktiengesellschaft, München (DE)

( * ) Notice: Under 35 U.S.C. 154(b), the term of this patent shall be extended for 0 days.

(21) Appl. No.: 09/125,573

(22) PCT Filed: Feb. 21, 1997

(86) PCT No.: PCT/DE97/00356

§ 371 Date: Nov. 13, 1998

§ 102(e) Date: Nov. 13, 1998

(87) PCT Pub. No.: WO97/31413

PCT Pub. Date: Aug. 28, 1997

(30) Foreign Application Priority Data

Feb. 23, 1996 (DE) .............................................. 196 08 285

(51) Int. Cl.[7] ...................................................... H02B 5/06

(52) U.S. Cl. ........................... 307/125; 307/130; 307/131

(58) Field of Search .................................... 307/112, 116, 307/119, 125, 126, 130, 131, 139; 361/601–605, 618–621; 200/16 B, 50.21, 50.27, 50 R; 218/13, 16, 17, 90, 123, 134, 43–46

(56) References Cited

U.S. PATENT DOCUMENTS

| | | | | |
|---|---|---|---|---|
| 4,443,779 | * | 4/1984 | Thuries | 336/92 |
| 4,687,890 | * | 8/1987 | Yamamoto et al. | 200/148 |
| 5,001,599 | * | 3/1991 | Itou et al. | 361/333 |
| 5,006,958 | * | 4/1991 | Sasamori et al. | 361/335 |
| 5,206,616 | * | 4/1993 | Stegmiiler | 335/126 |
| 5,559,669 | * | 9/1996 | Inami et al. | 361/612 |
| 5,796,060 | * | 8/1998 | Fuchsle et al. | 218/79 |

* cited by examiner

*Primary Examiner*—Fritz Fleming
(74) *Attorney, Agent, or Firm*—Kenyon & Kenyon

(57) ABSTRACT

In a high-voltage outdoor switch including a housing and an interrupter unit arranged in it, two current transformers are arranged on the enclosure of the switch, one to each side of the intrrupter unit. It was previously to install current transformers separate from high-voltage outdoor switches. The construction complexity and the costs are reduced by the constructional combination of the switch with the current transformers.

6 Claims, 2 Drawing Sheets

HIGH-VOLTAGE OUTDOOR SWITCH

The invention relates to a high-voltage outdoor switch including an insulating enclosure and an interrupter unit arranged within the enclosure and including two current transformers arranged on the enclosure to both sides of the interrupter unit, at least one of the current transformers being connected to high voltage during operation of the switch.

A metal-enclosed high-voltage switchgear assembly with circuit breakers, each of whose feeds is equipped with current transformers for measurement of the electrical current, is described in U.S. Pat. No. 4,032,820. Each of the current transformers is integrated into the enclosure housing of the switchgear assembly which is connected to ground potential.

BACKGROUND INFORMATION

The arrangement of one current transformer each on both sides of an interrupter unit makes possible the calculation of the current differentials and consequently the determination of possible ground faults in the area of the interrupter unit.

German Unexamined Patent No. 18 10 405 describes an enclosure housing connected to ground potential, including a high-voltage switch and current transformers arranged to both sides.

In outdoor switches, outdoor circuit breakers in particular, current transformers are usually installed separate from the switches in a separate enclosure. This requires a high degree of complexity, resulting in high costs.

A high-voltage outdoor switch according to the precharacterizing portion of claim 1 is known from European Patent No. 0 237 776 A2 in which the current transformers are mounted on the outside of the switch enclosure. This makes a separate housing for the current transformer necessary and represents a high assembly expense.

The object of the present invention is therefore to devise a means of monitoring the working order of a high-voltage outdoor switch by current transformers which is of simple design and is cost-effective.

According to the present invention, the objective is attained by the fact that at least one of the current transformers is arranged in the gas compartment of the interrupter unit.

In this way, the current converters can be cost-effectively integrated into the enclosure of the high-voltage switch and neither of the current transformers is required to be installed separately. In a particularly favorable form, low-power transformers, optical current transformers or surface wave elements can be used in this manner.

An advantageous embodiment of the invention provides that the high-voltage outdoor switch has the form of an erect pole column with current transformers arranged above and beneath the interrupter unit.

This is a space-saving and easily installed type of construction of the high-voltage switch according to the present invention.

Advantageously, the measuring signals of the current transformer connected to high voltage is conducted to ground potential via optical waveguide. This avoids having to route an electrical conductor from high voltage to ground potential. For the case in which the current transformer does not emit any measured values in the form of electrical signals, an electro-optical transducer is provided in the area of the current transformer. The electro-optical transducer can be supplied with power by tapping power from the magnetic field of the primary current or by the supply of power in the form of electromagnetic radiation, particularly via an optical waveguide. The converter can be located both within as well as outside the gas compartment of the interrupter unit.

The optical waveguide can be particularly advantageously integrated into the insulating enclosure of the high-voltage switch.

This can, for instance, be brought about by producing the insulating enclosure from a material into which the optical waveguide can be cast such as fiber-reinforced plastic, for instance.

In addition, it can be advantageously provided that at least one capacitive voltage transformer is integrated into the enclosure of a current transformer.

In this manner, all the necessary measuring devices for the monitoring of a high-voltage outdoor switch are combined in one single constructional unit.

An additional advantageous embodiment of the invention provides that the enclosure is at least partially designed as a composite insulator, made particularly of fiber-reinforced plastic.

The invention will be illustrated in the following with reference to the drawing of an exemplary embodiment and subsequently described.

Figure 1:
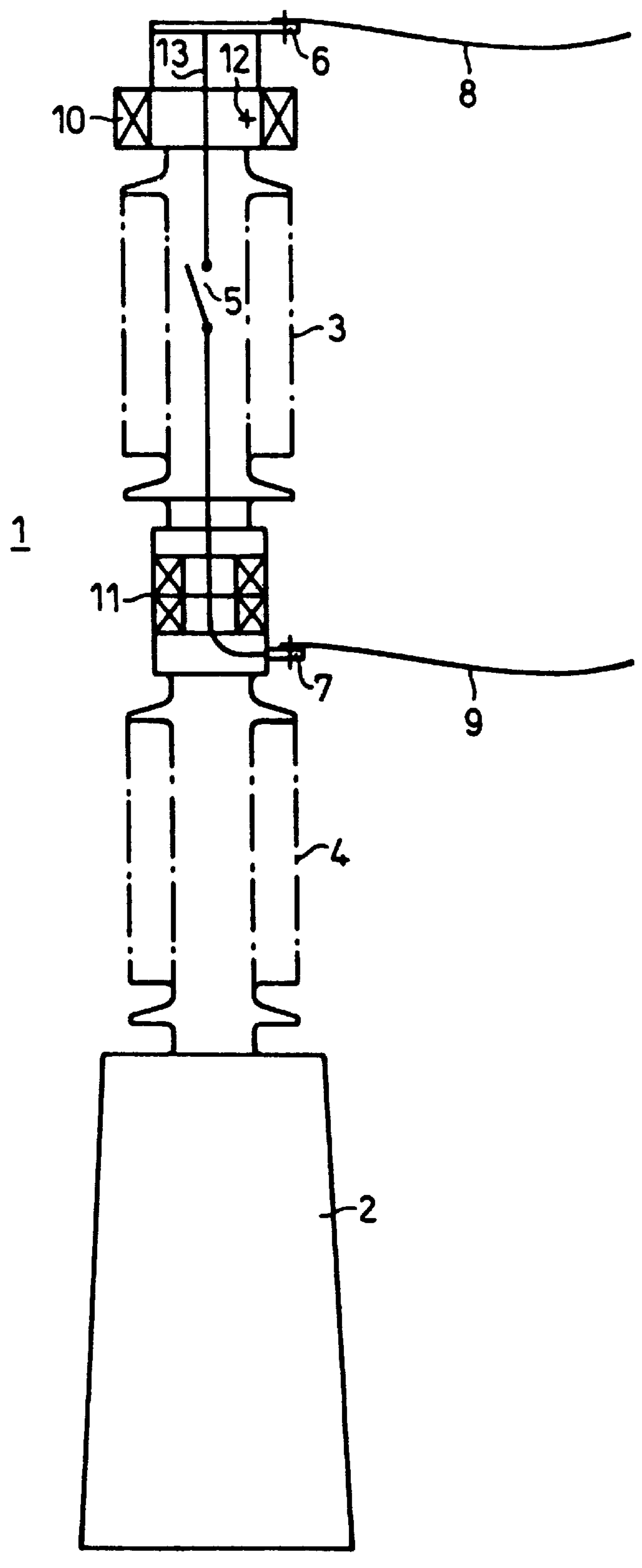
FIG. 1 shows a longitudinal section of a high-voltage outdoor switch including two current transformers and one voltage transformer in schematic representation.

A high-voltage circuit breaker having the form of a pole column 1, which is vertically installed on a mounting structure 2, is shown in FIG. 1. Pole column 1 has two insulating enclosure parts 3, 4 in which the interrupter unit 5 is schematically shown in simplified form in the upper part of insulating enclosure 3.

A drive rod, which will not be described in greater detail, for the transfer of drive power from a drive unit located in mounting structure 2 to interrupter unit 5 is located in the lower part of insulating enclosure 4.

Terminals 6, 7 of the circuit breaker are arranged at the upper end of the upper part of insulating enclosure 3 and between the upper part and lower part of insulating enclosure 4 and conductors 8, 9 for the connection to one overhead line each, for instance, are connected to these terminals.

Current transformers 10, 11 are arranged at the upper and lower ends, respectively, of the upper part of insulating enclosure 3, current transformers 10, 11 each being made up of a toroidal coil arranged coaxial to pole column 1 with a transformer core. Current transformers 10, 11 are advantageously designed as low-power transformers and concentrically surround a high-voltage conductor 13. Transformer 11 is arranged within the gas compartment of interrupter unit 5.

The measuring signals from current transformers 10, 11 can be transmitted by wireless transmission, for instance, to ground potential.

It could also be provided for optical current transformers to be used instead of the conventional current transformers, the optical current transformers being based, for instance, on the Faraday effect, and their measuring signals can be directed to ground potential via an optical waveguide located in the enclosure wall of insulating enclosure 3, 4 or on the outside of the enclosure.

Current transformer 10, arranged at the upper end of the upper part of insulating enclosure 3, also carries a measuring electrode 12 which, with high-voltage conductor 13, forms a capacitive voltage divider and thus permits the capacitive measurement of the high-voltage potential of high-voltage conductor 13.

Figure 2:
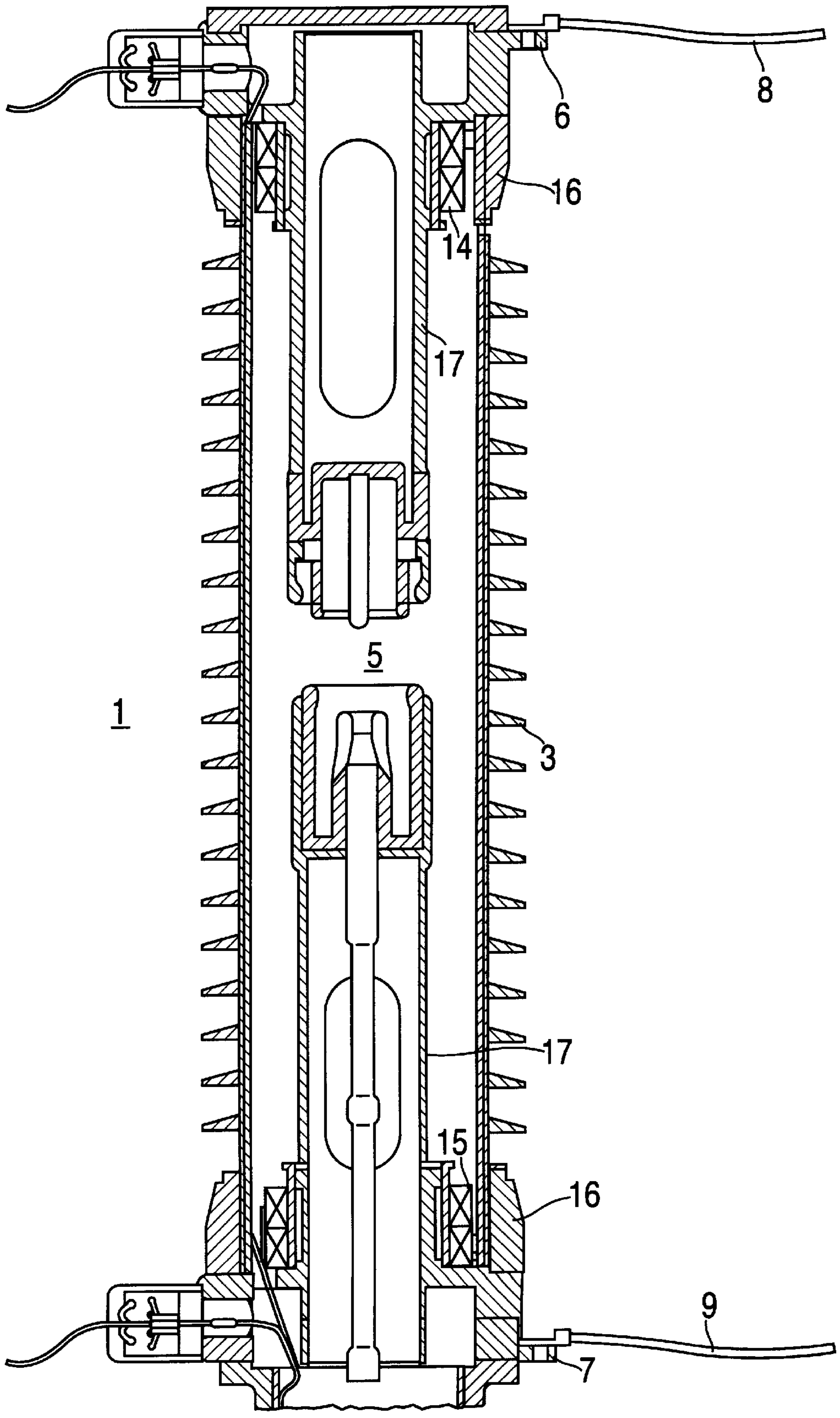
FIG. 2 shows a switch with two current transformers arranged in its enclosure.

Current transformers 10, 11 can be arranged in separate enclosures which can be attached to connecting flanges of insulating enclosure 3, 4. However, both current transformers 14, 15 can also be arranged within insulating enclosure 3 and coaxial to it, as shown in FIG. 2, thus eliminating the need for additional enclosures. In this case, the transformer cores can be attached to the supporting pipe of the interrupter unit.

What is claimed is:

1. A high-voltage outdoor switch, comprising:

an insulating enclosure;

an interrupter unit arranged within the insulating enclosure, the interrupter unit including a gas compartment and a supporting pipe; and current transformers, a first one of the current transformers arranged at a first side of the interrupter unit, a second one of the current transformers arranged at a second side of the interrupter unit, at least one of the current transformers coupled to a high voltage source during operation of the switch, at least one of the current transformers arranged in the gas compartment, being surrounded bv a metal flange that holds the insulating enclosure on an outside of the insulating enclosure, and being attached to the supporting pipe of the interrupter unit.

2. The high-voltage outdoor switch according to claim 1, wherein the switch is in a form of an erect pole column, the first one of the current transformers being arranged above the interrupter unit, and the second one of the current transformers being arranged below the interrupter unit.

3. The high-voltage outdoor switch according to claim 1, further comprising:

optical wave guides, measuring signals from the at least one of the current transformers coupled to the high voltage source being conducted to a ground potential via the optical wave guides.

4. The high-voltage outdoor switch according to claim 3, wherein one least one of the optical waveguides is integrated into the insulating enclosure.

5. The high-voltage outdoor switch according to claim 1, wherein at least one of the current transformers includes a transformer enclosure, the high-voltage outdoor switch further comprising:

a capacitive voltage transformer integrated into the transformer enclosure.

6. The high-voltage outdoor switch according to claim 1, wherein the insulating enclosure includes a composite insulator made of fiber-reinforced plastic.

* * * * *